United States Patent [19]
Beam

[11] Patent Number: 5,950,197
[45] Date of Patent: Sep. 7, 1999

[54] CHARACTER SET AND PROGRAMMING LANGUAGE EXTENSION FOR ENLARGING THE CAPACITY OF A DATE CODE

[76] Inventor: William N. Beam, 2073 Webster La., Des Plaines, Ill. 60018

[21] Appl. No.: 09/055,836

[22] Filed: Apr. 6, 1998

Related U.S. Application Data

[60] Provisional application No. 60/045,857, May 7, 1997.
[51] Int. Cl.$^6$ .................................................. G06F 17/30
[52] U.S. Cl. .............................................. 707/6; 707/102
[58] Field of Search ............................... 707/6, 102

[56] References Cited

U.S. PATENT DOCUMENTS

| | | | |
|---|---|---|---|
| 5,596,554 | 1/1997 | Hagadorn | 368/82 |
| 5,600,836 | 2/1997 | Alter | 707/101 |
| 5,630,118 | 5/1997 | Shaughnessy | 707/1 |
| 5,668,989 | 9/1997 | Mao | 707/101 |
| 5,719,826 | 2/1998 | Lips | 368/29 |
| 5,740,442 | 4/1998 | Cox et al. | 395/704 |
| 5,758,336 | 5/1998 | Brady | 707/6 |
| 5,758,346 | 5/1998 | Baird | 707/101 |
| 5,761,668 | 6/1998 | Adamchick | 707/101 |
| 5,797,117 | 8/1998 | Gregovich | 707/101 |
| 5,806,067 | 9/1998 | Conner | 707/100 |
| 5,808,889 | 9/1998 | Burgess | 364/737 |
| 5,809,500 | 9/1998 | Nolan | 707/6 |
| 5,812,841 | 9/1998 | Soeder | 707/6 |
| 5,828,890 | 10/1998 | Rehbock et al. | 395/733 |
| 5,838,979 | 11/1998 | Hart et al. | 395/707 |

*Primary Examiner*—Wayne Amsbury
*Attorney, Agent, or Firm*—McAndrews, Held & Malloy, Ltd.

[57] ABSTRACT

The present invention provides a new date code with a two digit year code that is compatible with standard date codes, and that may represent dates well beyond the year 1999. The invention defines a set of extended symbols that may be used as first or second digits in the new two digit year code in the new date code. In addition, the invention provides an interpretation of the extended symbols which allows the new year codes to be added, subtracted, or otherwise manipulated and still provide a two symbol representation of years well beyond 1999. In addition, the extended symbols may be used in non-year code mathematical operations to provide an extended range of results that still fit in a two symbol format.

18 Claims, 5 Drawing Sheets

Microfiche Appendix Included
(1 Microfiche, 22 Pages)

```
            Date program written: April 4, 1997
            Revised: April 11, 1997
*/ include <stdio.h>
include <string.h> char CheckEntry(char);
int Code2Dec (char, char);
void PrintResult (char);
void CalculateResult(char);

char code1[3], code2[3];
int value1, value2, decResult;
/* Sets of valid characters of date code format */
char FirstChars[31] = {"0123456789.(+$*)-/,`ABCDEFGHIJ"};
char SecondChars[11] = {"0123456789"};

char CheckEntry(char code[3])
/* Checks validity of date code year and returns TRUE if invalid */
{
        if ((strchr (FirstChars, code[0]) != NULL) && (strchr(SecondChars, code[1]) != NULL))
                return 0; /* Date code year in valid format */
        Else
        {
                printf("Set of valid first characters: {%s}\n", FirstChars);
                printf("Set of valid second characters: {%s}\n", SecondChars);
                return 1;
        }
}
```

```
void PrintResult (char oper)
{
        char *Date="Date", *Coded="Coded", *Operation="Operation", *Value="Value";
        char *Subtraction="Subtraction", *Addition="Addition", *Numeric="Numeric";
        char ResultLine[16];

printf("\n%-19s%-19s%-19s", Coded, Numeric, Value);
        if (oper=='-') printf("%-19s", Date);
        printf("\n%-19s%-19s", Operation, Operation);
        if (oper=='-') printf("%-19s%-19s", Subtraction, Subtraction);
        else printf("%-19s", Addition);
        sprintf(ResultLine, "%s%c%s = %c%c", code1, oper, code2, FirstChars[decResult/10],
                SecondChars[decResult%10]);
        printf("\n%-19s", ResultLine);
        sprintf(ResultLine, "%d%c%d = %d", value1, oper, value2, decResult);
        printf("%-19s", ResultLine);
        if (oper=='-')
        {
                sprintf(ResultLine, "%d%c%d = %d", (value1+1900), oper, value2, (decResult+1900));
                printf("%-19s", ResultLine);
                sprintf(ResultLine, "%d%c%d = %d", (value1+1900), oper, (value2+1900), decResult);
                printf("%-19s\n", ResultLine);
        }
        Else
        {
                sprintf(ResultLine, "%d%c%d = %d", (value1+1900), oper, value2, (decResult+1900));
                printf("%-19s\n", ResultLine);
        }
410  } int Code2Dec(char a, char b)
/* Converts a date code to decimal format and returns decimal number */
{
        register int i = 0, result;

while (FirstChars[i] != NULL) /* Parse set of first characters */
        {
                if (a == FirstChars[i]) {result = i*10; break; }/* Locate code */
                i++; /* Continue search */
        }i=0;
        while (SecondChars[i] != NULL) /* Parse set of second characters */
        {
                if (b == SecondChars[i]) {result += i; break; }/* Locate code */
                i++; /* Continue search */
        }
        return (result); /* Return date code in decimal format */
}
```

```
void CalculateResult(char oper)
{
        decResult = (oper == '-') ? (value1 - value2) : (value1 + value2);
        if (decResult < 0) printf("Underflow! Result (%d) out of range.\n", decResult);
        else if (decResult >= (strlen(FirstChars) * 10))
                printf("Overflow! Result (%d) out of range.\n", decResult);
        Else
                PrintResult(oper);
}
```

402

```
void main(void)
/* Prompts for input string and calls calculating functions */
{/* begin main function */
        char oper;

while (1) /* loop forever */
        {/* while loop */
                printf("\nEnter first date or value ('x' to exit): ");
                scanf ("%s", code1);
                if ((code1[0] == 'x') || (code1[0] == 'X')) break;
                if (!CheckEntry(code1))
                {/* outer if loop */
                        value1=Code2Dec(code1[0], code1[1]);
                        printf("[Value1 = %d, Year1 = %d]\n", value1, (value1+1900));
                        printf("Enter second date or value: ");
                        scanf ("%s", code2);
                        if (!CheckEntry(code2))
                        {/* nested if loop */
                                value2=Code2Dec(code2[0], code2[1]); oper=getchar();
                                printf("[Value2 = %d, Year2 = %d]\n", value2, (value2+1900));
                                printf("Enter '-' for subtraction or '+' for addition: ");
                                scanf ("%c", &oper);
                                if ((oper == '-') || (oper == '+'))
                                        CalculateResult(oper);
                                else printf("Invalid operation.\n");
                        }/* end nested if loop */
                }/* end outer if loop */
        }/* end while loop */
}/* end main function */
```

Enter first date or value ('x' to exit):   F5
[Value1 = 255, Year1 = 2155]
Enter second date or value:   23
[Value2 = 23, Year2 = 1923]
Enter '-' for subtraction or '+' for addition:   +

| Coded Operation | Numeric Operation | Value Addition |
|---|---|---|
| F5+23 = H8 | 255+23 = 278 | 2155+23 = 2178 |

Enter first date or value ('x' to exit):   +7
[Value1 = 127, Year1 = 2027]
Enter second date or value:   97
[Value2 = 97, Year2 = 1997]
Enter '-' for subtraction or '+' for addition:   -

| Coded Operation | Numeric Operation | Value Addition | Date Subtraction |
|---|---|---|---|
| +7-97 = 30 | 127-97 = 30 | 2027-97 = 1930 | 2027-1997 = 30 | ained to two digits=02). In other words, the
CHARACTER SET AND PROGRAMMING LANGUAGE EXTENSION FOR ENLARGING THE CAPACITY OF A DATE CODE

CROSS-REFERENCE TO RELATED APPLICATIONS

This Application claims the benefit of U.S. Provisional Application No. 60/045,857, filed May 7, 1997.

MICROFICHE APPENDIX

This disclosure includes a microfiche appendix of 1 microfiche consisting of a total number of 22 frames.

BACKGROUND OF THE INVENTION

Industry started using the computer programming language COBOL (Common Business Oriented Programming Language) over 30 years ago. After three decades, COBOL has managed to achieve a pervasive presence in nontechnical business applications including, for example, insurance and banking. One ubiquitous element of COBOL programs and other computer language programs written for business applications is a date code. A date code is a six digit sequence representing a day, a month, and a year. The date code is usually formatted as YY-MM-DD or MM-DD-YY, where YY is a two digit year code, currently assumed to be in the twentieth century (e.g., 89 represents 1989), MM is a two digit month code (e.g., 11 represents November), and DD is a two digit day code. Thus, the date code 89-11-25 represents the $25^{th}$ day of November, 1989. COBOL programs and other computer language programs use date codes to determine a wide variety of information.

Date codes are responsible, for example, for determining when checks should be issued, when insurance policies expire, and when interest should be credited to an account. In fact, it is difficult to conceive of a COBOL business application that does not use a date code. For a variety of reasons, traditional COBOL business applications have almost always exclusively used two digits to represent a year. This was particularly true in the 1960's, 70's, 80's, although much COBOL code written in the 90's also use a two digit year representation of the date code. Therefore, as it stands, a significant percentage of COBOL business applications cannot understand, encode, or operate in general with any years subsequent to the year 1999.

Furthermore, reports concerning COBOL applications that are failing today, well before the year 2000, are becoming more commonplace. One source of these failures is COBOL program code that generates a year that the program cannot interpret correctly, possibly by adding offsets to years that it can understand. For example, a COBOL program calculating the expiration date of a five year insurance policy begun in 1997 will come up with the result 1902 (97+05=102, and truncated to two digits=02). In other words, the insurance policy begun today expired 95 years ago.

Industry analysts estimate that 90% of all COBOL business applications will generate critical errors (for example, canceling insurance policies prematurely) because of their year 2000 incompatibility. The analysts further estimate that some corporations, particularly the larger ones, will each spend between $50–$100 million trying to rewrite their COBOL business applications to understand years in the twenty-first century. A total price tag of over $500 billion has been placed on correcting, rewriting, and updating all COBOL business applications for year 2000 compliance. A significant part of the total cost includes the need for an additional 200,000 COBOL programmers to join the ranks of the existing pool of nearly 1,000,000 who will attempt to bring COBOL business applications worldwide into conformance.

As the new millennium approaches, corporations face the significant challenge of correcting existing applications to handle the expanded date formats of the 21st century. The challenge is far greater than simply updating COBOL source code, however, since date code incompatibilities exist in a number of problem areas in addition to the source code itself. These problem areas include: COBOL compilers and other computer language compilers that only support two digit year codes, data files and data bases containing information including, for example, insurance records and bank deposits, and operating systems and system clocks that do not support dates greater than 1999. Thus, even if a corporation could find qualified COBOL programmers to update their COBOL business applications, the length of time needed to examine all the possible problem areas will be far greater than most corporations realize. Because of the complexity of the COBOL business applications, and their significant reliance on time-based calculations, industry cannot wait until 1999 for a solution.

A solution is needed immediately since a shortage of COBOL programmers already exists and is worsening, applications are starting to fail today, and programming costs will rise significantly over the next few years as the demand for COBOL programmers far outstrips the supply. Furthermore, the year 2000 problem spans all computer platforms and operating environments, all of which must be corrected.

A number of companies have attempted to provide solutions for the year 2000 problem. Unfortunately, most of these solutions require changing all aspects of a particular COBOL business application, including source code, data files, and even the COBOL compiler itself. One common approach to solving the date code problem is expanding the date code to use a four digit year code instead of a two digit year code. Thus, instead of representing Nov. 25, 1989 as 89-11-25, the new date code would represent Nov. 25, 1989 as 1989-11-25.

One difficulty inherent in switching to a four digit year code representation is that old data files would no longer be compatible with the revised format. Thus, corporations would also have to find a way to convert all of their old data, which may consist of decades of transactions and millions of records, to the new format. Furthermore, most of the COBOL business application source code would have to be modified as well, in order to properly read, store, and manipulate the larger year code, as well as perform mathematical operations with it. Another difficulty inherent with the four digit year code is that many COBOL compilers today only support the standard two digit year code. Therefore, switching to a four digit year code requires changes not only to the data files and COBOL source code, but also to the COBOL compiler itself. Changes to the COBOL compiler may not even be possible for most corporations because they use COBOL compilers licensed from, and under the control of, third parties.

Therefore, a need remains for a solution to the year 2000 COBOL problem which overcomes the disadvantages discussed above and previously experienced.

BRIEF SUMMARY OF THE INVENTION

It is an object of the present invention to provide a solution for the year 2000 date code problem.

It is another object of the present invention to provide a solution for the year 2000 date code problem that requires minimal modifications, if any, to existing COBOL programs or other computer language programs.

It is yet another object of the present invention to provide a solution for the year 2000 date code problem that requires minimal modifications, if any, to existing data files produced with COBOL business applications.

It is another object of the present invention to provide a solution for the year 2000 date code problem that requires minimal modifications, if any, to existing COBOL compilers or other computer language compilers.

It is still another object of the present invention to provide an inexpensive solution for the year 2000 date code problem.

It is another object of the present invention to provide a date code for programming languages that may contain an extended range of years beyond the year 2000.

With the present six digit date code, the two digit year code ends at "99", for 1999. To continue the six digit code after 1999, one of the "year" symbols must become a two digit or multi-digit symbol. For example:

Dec. 31, 1999 equivalent 1 2 3 1 9 9

Jan. 1, 2000 equivalent 0 1 0 1 10 0 i.e., two digit symbol, or 0 1 0 1 1 0

Jan. 1, 2001 equivalent 0 1 0 1 10 1 or 0 1 0 1 1 01

Jan. 1, 2000 equivalent 1 1 01 0 100 i.e., three digit symbol or 0 1 0 1 0 0100 i.e., four digit symbol The number of digits per symbol can continue ad infinitum.

The present invention provides a new date code that may encode the year using only two symbols, that maintains compatibility with standard date codes, and that is able to represent an extended range of years beyond the year 1999. The new date code makes use of extended symbols beyond the '0–9' characters typically used in a date code. The extended symbols may be custom symbols, for example, a 0 with a square, triangle, or other geometric shape around it, or they may be any other sets of symbols including characters currently available on standard keyboards, for example '!', '@', etc. Either the first character or the second character or both in the year code of the new date code may contain these extended symbols. In conjunction with a predetermined set of definitions or an interpretation for the values of the extended symbols, COBOL programs may continue to use a two digit or two symbol year code while performing standard addition, subtraction, and other mathematical functions.

BRIEF DESCRIPTION OF THE DRAWINGS

FIGS. 4A–4C illustrate one possible implementation of a program that is able to recognize and manipulate year codes using extended symbols.

DETAILED DESCRIPTION OF THE INVENTION

Figure 1:
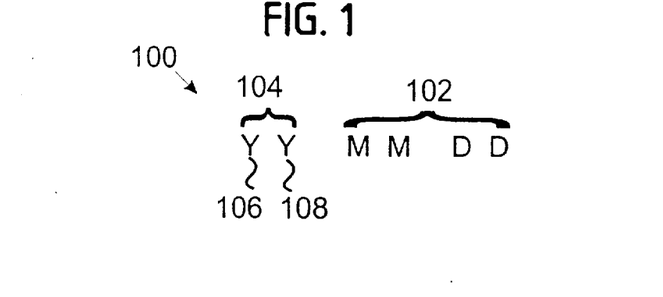
FIG. 1 illustrates a date code in year-month-day format.

The present invention provides a new date code with a two symbol or two digit year code that is compatible with standard date codes, and that may represent dates well beyond the year 1999. Turning now to FIG. 1, a standard date code 100 is shown.

The standard date code 100 includes a month-day portion 102 and a year code 104. The year code 104 includes a first year digit 106 and a second year digit 108.

The month-day portion 102 is used to record the month and day of interest using a two digit month and a two digit day. For example, '11 25' indicates the $25^{th}$ day of November. In general, this format is sufficient to record any month and any day. The year code 104 of the standard date code 100 is not as versatile, however. The year code 104 of the standard date code 100 uses two numeric digits to represent a year in the 1900's. Thus, the range of years that the standard date code 100 can represent is 1900–1999, corresponding to the digits 00–99 in the year code 104. As a result, the standard date code 100 cannot represent any year after 1999.

The present invention defines extended symbols (beyond numeric digits) that may be used in the year code 104, either as a first year digit 106 or a second year digit 108. Table 1 shows an embodiment of the present invention in which extended symbols are defined for the first year digit 106, while retaining numeric digits for the second year digit 108.

TABLE 1

| Extended Symbols | | | |
|---|---|---|---|
| Valid symbols for first year digit 106 | | Valid symbols for second year digit 108 | |
| 0 | . | A | 0 |
| 1 | ( | B | 1 |
| 2 | + | C | 2 |
| 3 | $ | D | 3 |
| 4 | * | E | 4 |
| 5 | ) | F | 5 |
| 6 | – | G | 6 |
| 7 | / | H | 7 |
| 8 | ' | I | 8 |
| 9 |   | J | 9 |

Thus, COBOL source code adhering to the extended symbols found in Table 1 would allow any of 0 through 9, . though ', and A through J as first characters in the first year digit 106, and only the characters 0 through 9 in the second year digit 108. Thus a new year code according to the present invention may be, for example, 79, +0, or even F6. The interpretation of year code using extended symbols will be described shortly.

Table 1 shows extended symbols that are characters found on most standard keyboards. In another embodiment of the present invention, however, the extended symbols may be any arbitrary character, including, for example, numeric digits surrounded with a square, triangle, or other geometric shape. If the arbitrary characters are not found on the keyboard, then they may be entered, in a text editor for example, with an extended keyboard sequence. For example, holding down the Alt key and pressing one or more digits in a sequence (similar to the method that some popular word processors provide) may provide one method for producing an arbitrary character in a text editor.

Figure 2:
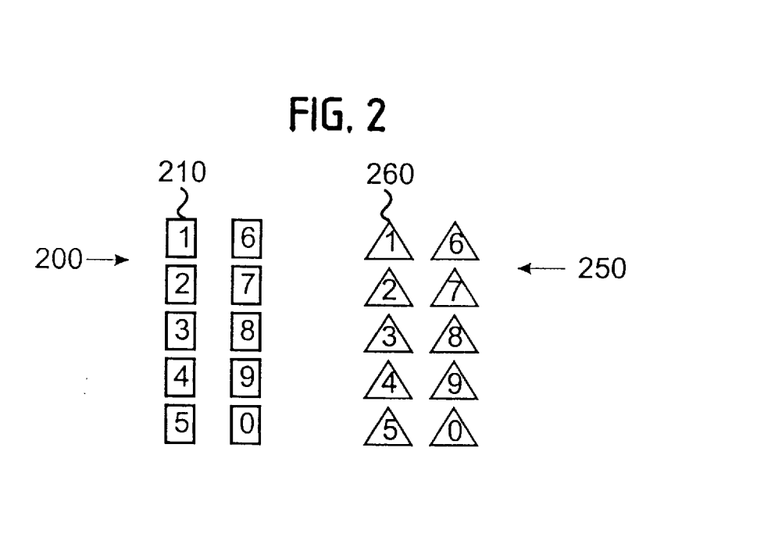
FIG. 2 illustrates examples of extended symbols suitable for use with the new date code of the present invention.

FIG. 2 shows an example of a first extended symbol set 200 including a first extended symbol 210. FIG. 2 also shows a second extended symbol set 250 including a second extended symbol 260. The first extended symbol set 200 consists of numeric digits surrounded by a square, while the second extended symbol set 250 consists of numeric digits surrounded by a triangle. Thus the first extended symbol 210 would appear on a computer screen or on a printout as a '1' digit surrounded by a square. Similarly, the digits '0' and '2–9' would also appear on a screen or on a printout surrounded with a square. An arbitrary symbol may be used as an extended symbol, not only those including a square. For example, the second extended symbol set 250 defines extended symbols surrounded with a triangle. The second extended symbol 260, for example, consists of a triangle drawn around a '1' digit. Similarly, the other symbols in the second extended symbol set 260 are formed by triangles drawn around the digits '0' and '2–9'.

In other embodiments of the present invention, extended symbols may be used for both the first year digit 106 and the second year digit 108, or any combination thereof. In addition, many more symbols may be included in the selection of extended symbols. That is, the invention is not limited to only the extended symbols shown in Table 1, or described in connection with FIG. 2. Rather, any arbitrary symbols may be used.

Once a set of extended symbols has been chosen for use, an interpretation of the extended symbols will allow the year code 104 to extend the range of years that it can represent beyond 1999. For convenience, an interpretation of the extended symbols shown in Table 1 will used. However, it will be recognized that the invention may provide an interpretation for any set of symbols, including those shown in FIG. 2, or other arbitrary symbols.

Table 2 illustrates one possible interpretation of the set of extended symbols shown in Table 1. In one embodiment of the present invention, the symbols are interpreted internally to COBOL programs as a multidigit expansion. This is illustrated in Table 2 in the columns labelled "expansion". Note that the symbols '0–9' retain their standard definition, thus ensuring compatibility with existing year codes, data files, and data bases.

TABLE 2

Interpretation of Extended Symbols.

| Symbol | Expansion | Symbol | Expansion | Symbol | Expansion |
|--------|-----------|--------|-----------|--------|-----------|
| 0 | 0 | . | 10 | A | 20 |
| 1 | 1 | ( | 11 | B | 21 |
| 2 | 2 | + | 12 | C | 22 |
| 3 | 3 | $ | 13 | D | 23 |
| 4 | 4 | * | 14 | E | 24 |
| 5 | 5 | ) | 15 | F | 25 |
| 6 | 6 | – | 16 | G | 26 |
| 7 | 7 | / | 17 | H | 27 |
| 8 | 8 | ' | 18 | I | 28 |
| 9 | 9 |   | 19 | J | 29 |

Figure 3:
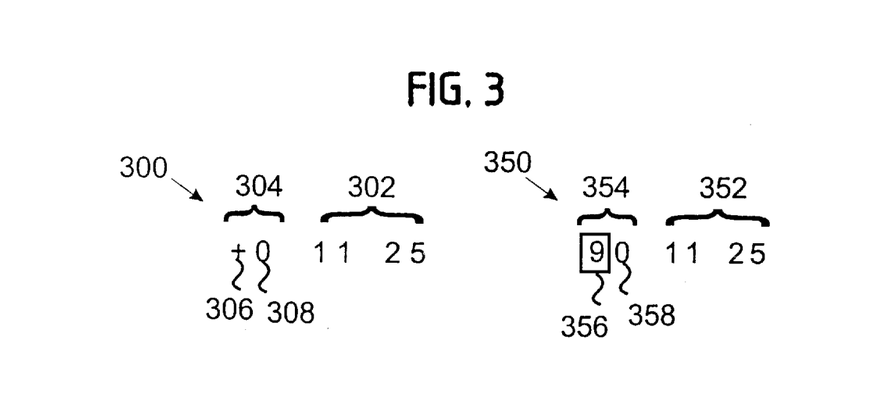
FIG. 3 shows two date codes according to the present invention that use extended symbols.

Applying the interpretation of the extended symbols shown in Table 2, one embodiment of the present invention may internally convert the extended symbol into its corresponding expansion when working with year codes. For example, the year code 'F7' would be interpreted as 257 years from 1900. In other words, the year code 'F7' represents the year 2157. FIG. 3 illustrates additional examples. Although Table 2 lists symbols with their corresponding two digit expansion, alternate embodiments of the present invention may use symbols that represent two, three, or more digits. Thus, for example, a symbol may be defined for use as the first symbol in a date code to represent the three digit sequence "210". A second numeric digit, for example, '3' might then be used as the second date code character. The resulting date, "2103" would thereby be encoding using only two symbols or characters. The last two rows of Table 3 provide illustrative examples of a three digit symbol (used to encode the year 2103) and a four digit symbol (used to encode the year 2134).

FIG. 3 illustrates a first new date code 300 that includes a first new month-day portion 302, and a first new year code 304. In turn, the first new year code 304 includes a first new year digit 306 and a second new year digit 308. FIG. 3 also shows a second new date code 350 that includes a second new month-day portion 352, and a second new year code 354. In turn, the second new year code 354 includes a third new year digit 356 and a fourth new year digit 358.

The first and second new month-day portions 302 and 352 function in the same way as the standard date code 100 month-year portion 102. That is, the first and second new month-day portions 302 and 352 may represent any month and any day using two numeric digits. The first and second new year codes 304 and 354, however, now include extended symbols, more specifically, a '+' and a 'squared-nine'. The entire first new date code 300 is '+0 11 25' and, using the expansion provided in Table 2, represents the $25^{th}$ day of November, 2020 ('+0' corresponds to 120 years from 1900). The second new date code 350 is similarly interpreted. Assuming that the 'squared-nine' symbol used as the third new year digit 356, has, for example, an expansion of '19' (shown in Table 3), then the interpretation of the second new date code 350 shown in FIG. 3 is the $25^{th}$ day of November, 2090 (1900+190). The second new date code 350 illustrates that any arbitrary symbol may be used as an extended character.

Table 3 presents additional examples of years and the resulting year code according to an embodiment of the present invention described above with reference to Table 1 and Table 2. Note that the year to be coded in Table 3 may be determined by adding 1900 to the date code numeric value. In addition, Table 3 presents a set of alternate symbols that may be used to represent the year to be coded.

TABLE 3

Example datecodes.

| Symbol Set | Symbol Expansion | Year to be coded | Date code for the Year | Date code numeric value | Date code for the Year (Alternate Symbols) |
|------------|------------------|------------------|------------------------|-------------------------|---------------------------------------------|
| 0 | 0 | 1900 | 0 0 | 0 0 | 0 0 |
| 1 | 1 | 1901 | 0 1 | 01 | 0 1 |
| 9 | 9 | 1999 | 9 9 | 99 | 9 9 |
| . | 10 | 2000 | . 0 | 100 | ⓪ 0 |
| ( | 11 | 2010 | ( 0 | 110 | ① 0 |
| + | 12 | 2021 | + 1 | 121 | ② 1 |
| $ | 13 | 2033 | $ 3 | 133 | ③ 3 |
| * | 14 | 2045 | * 5 | 145 | ④ 5 |
| ) | 15 | 2050 | ) 0 | 150 | ⑤ 0 |
| – | 16 | 2062 | – 2 | 162 | ⑥ 2 |

TABLE 3-continued

Example datecodes.

| Symbol Set | Symbol Expansion | Year to be coded | Date code for the Year | Date code numeric value | Date code for the Year (Alternate Symbols) |
|---|---|---|---|---|---|
| / | 17 | 2074 | / 4 | 174 | ⑦ 4 |
| , | 18 | 2087 | , 7 | 187 | ⑧ 7 |
| ' | 19 | 2099 | ' 9 | 199 | ⑨ 9 |
| A | 20 | 2100 | A 0 | 200 | △0̸ 0 |
| B | 21 | 2110 | B 0 | 210 | △1̸ 0 |
| C | 22 | 2123 | C 3 | 223 | △2̸ 3 |
| D | 23 | 2134 | D 4 | 234 | △3̸ 4 |
| E | 24 | 2140 | E 0 | 240 | △4̸ 0 |
| F | 25 | 2155 | F 5 | 255 | △5̸ 5 |
| G | 26 | 2167 | G 7 | 267 | △6̸ 7 |
| H | 27 | 2177 | H 7 | 277 | △7̸ 7 |
| I | 28 | 2180 | I 0 | 280 | △8̸ 0 |
| J | 29 | 2199 | J 9 | 299 | △9̸ 9 |
| (NA) | 210 | 2103 | (NA) | 2103 | ⓪ 0 |
| (NA) | 2134 | 2134 | (NA) | 02134 (2134) | 0 ⬠4 |

COBOL and similar computer languages use the EBCDIC (Extended Binary Coded Decimal Interchange Code) code for letters, numbers, and special characters as shown in

TABLE 4

EBCDIC Codes

| Symbol | EBCDIC | Symbol | EBCDIC |
|---|---|---|---|
| (space) | 01000000 | ? | 01101111 |
| ! | 01011010 | @ | 01111100 |
| " | 01111111 | A | 11000001 |
| # | 01111011 | B | 11000010 |
| $ | 01011011 | C | 11000011 |
| % | 01101100 | D | 11000100 |
| & | 01010000 | E | 11000101 |
| ' | 01111101 | F | 11000110 |
| ( | 01001101 | G | 11000111 |
| ) | 01011101 | H | 11001000 |
| * | 01011100 | I | 11001001 |
| + | 01001110 | J | 11010001 |
| ` | 01101011 | K | 11010010 |
| - | 01100000 | L | 11010011 |
| . | 01001011 | M | 11010100 |
| / | 01100001 | N | 11010101 |
| 0 | 11110000 | O | 11010110 |
| 1 | 11110001 | P | 11010111 |
| 2 | 11110010 | Q | 11011000 |
| 3 | 11110011 | R | 11011001 |
| 4 | 11110100 | S | 11100010 |
| 5 | 11110101 | T | 11100011 |
| 6 | 11110110 | U | 11100100 |
| 7 | 11110111 | V | 11100101 |
| 8 | 11111000 | W | 11100110 |
| 9 | 11111001 | X | 11100111 |
| : | 01111010 | Y | 11101000 |
| ; | 01011110 | Z | 11101001 |
| < | 01001100 | [ | 01001010 |
| = | 01111110 | \ | NONE |
| > | 01101110 | ] | 01011010 |

For the new symbols, ⓪ through ⑨, △0̸ through △9̸, and other extended symbols, new EBCDIC binary codes may be added as shown in Table 5. The new codes may be any binary configuration not previously used in the original EBDIC codes shown in Table 4.

TABLE 5

New EBCDIC Codes for New Symbols
Date code table from the year 1900 through 2199 using the unique characters and a new EBCDIC binary code for the new symbols.

| Symbol | Symbol Numeric Value | Year | Year Date Code | Date Code Numberic Value | EBCDIC Binary | | | |
|---|---|---|---|---|---|---|---|---|
| 0 | 0 | 1900 | 0 0 | 00 | 1111 | 0000 | 1111 | 0000 |
| 1 | 1 | 1901 | 0 1 | 01 | 1111 | 0000 | 1111 | 0001 |
| 9 | 9 | 1999 | 9 9 | 99 | 1111 | 1011 | 1111 | 1001 |

TABLE 5-continued

New EBCDIC Codes for New Symbols
Date code table from the year 1900 through 2199 using the unique
characters and a new EBCDIC binary code for the new symbols.

| Symbol | Symbol Numeric Value | Year | Year Date Code | Date Code Numberic Value | EBCDIC Binary | | | |
|---|---|---|---|---|---|---|---|---|
| ☐0 | 10 | 2000 | ☐0 0 | 100 | 0001 | 0000 | 1111 | 0000 |
| ☐1 | 11 | 2010 | ☐1 0 | 110 | 0001 | 0001 | 1111 | 0000 |
| ☐2 | 12 | 2021 | ☐2 1 | 121 | 0001 | 0010 | 1111 | 0001 |
| ☐3 | 13 | 2033 | ☐3 3 | 133 | 0001 | 0011 | 1111 | 0011 |
| ☐4 | 14 | 2045 | ☐4 5 | 145 | 0001 | 0100 | 1111 | 0101 |
| ☐5 | 15 | 2050 | ☐5 0 | 150 | 0001 | 0101 | 1111 | 0000 |
| ☐6 | 16 | 2062 | ☐6 2 | 162 | 0001 | 0110 | 1111 | 0010 |
| ☐7 | 17 | 2074 | ☐7 4 | 174 | 0001 | 0111 | 1111 | 0100 |
| ☐8 | 18 | 2087 | ☐8 7 | 187 | 0001 | 1000 | 1111 | 0111 |
| ☐9 | 19 | 2099 | ☐9 9 | 199 | 0001 | 1001 | 1111 | 1001 |
| △0 | 20 | 2100 | △0 0 | 200 | 0010 | 0000 | 1111 | 0000 |
| △1 | 21 | 2100 | △1 0 | 210 | 0010 | 0001 | 1111 | 0000 |
| △2 | 22 | 2123 | △2 3 | 223 | 0010 | 0010 | 1111 | 0011 |
| △3 | 23 | 2134 | △3 4 | 234 | 0010 | 0011 | 1111 | 0100 |
| △4 | 24 | 2140 | △4 0 | 240 | 0010 | 0100 | 1111 | 0000 |
| △5 | 25 | 2155 | △5 5 | 255 | 0010 | 0101 | 1111 | 0101 |
| △6 | 26 | 2167 | △6 7 | 267 | 0010 | 0110 | 1111 | 0111 |
| △7 | 27 | 2177 | △7 7 | 277 | 0010 | 0111 | 1111 | 0111 |
| △8 | 28 | 2180 | △8 0 | 280 | 0010 | 1000 | 1111 | 0000 |
| △9 | 29 | 2199 | △9 9 | 299 | 0010 | 1001 | 1111 | 1001 |
| ◯0 | 210 | 2110 | ◯0 0 | 0210 | (NA) | | (NA) | |
| ⬠4 | 0234 | 2134 | 0⬠4 | 00234 | (NA) | | (NA) | |

Once an interpretation for the extended symbols has been provided (for example, the interpretation shown in Table 2), numeric operations may be performed to provide an extended range of operation over the standard two digit date code 102. Table 6 shows the results of several sample year code subtractions using the extended symbols shown in Table 1 and their interpretation shown in Table 2. Table 6 also shows the result of each subtraction in standard notation (using only the digits '0–9').

TABLE 6

Example results of date operations.

| Operation | Result expressed with extended symbols | Standard Notation |
| --- | --- | --- |
| A0 − .0 | .0 | 100 |
| A9 − .0 | .9 | 109 |
| A9 − A0 | 9 | 9 |
| .6 − 99 | 7 | 7 |
| J9 − A9 | 90 | 90 |
| J9 − .4 | '5 | 195 |
| J5 − 00 | J5 | 295 |

Furthermore, once an interpretation for the extended symbols is in place, general mathematical operations upon the extended symbols become possible. Table 7 shows several examples of general mathematical operations upon the extended symbols shown in Table 1 according to the interpretation provided in Table 2. Table 7 also shows the result of each operation in standard notation (using only the digits '0–9').

TABLE 7

Example results of addition and subtraction.

| Operation | Result | Conventional Notation |
| --- | --- | --- |
| 99 + 20 | (9 | 119 |
| F4 + 10 | G4 | 264 |
| H7 − 22 | F5 | 255 |
| *5 − +3 | 22 | 22 |

An Example Implementation of a Datecode Solution

Figure 4A:
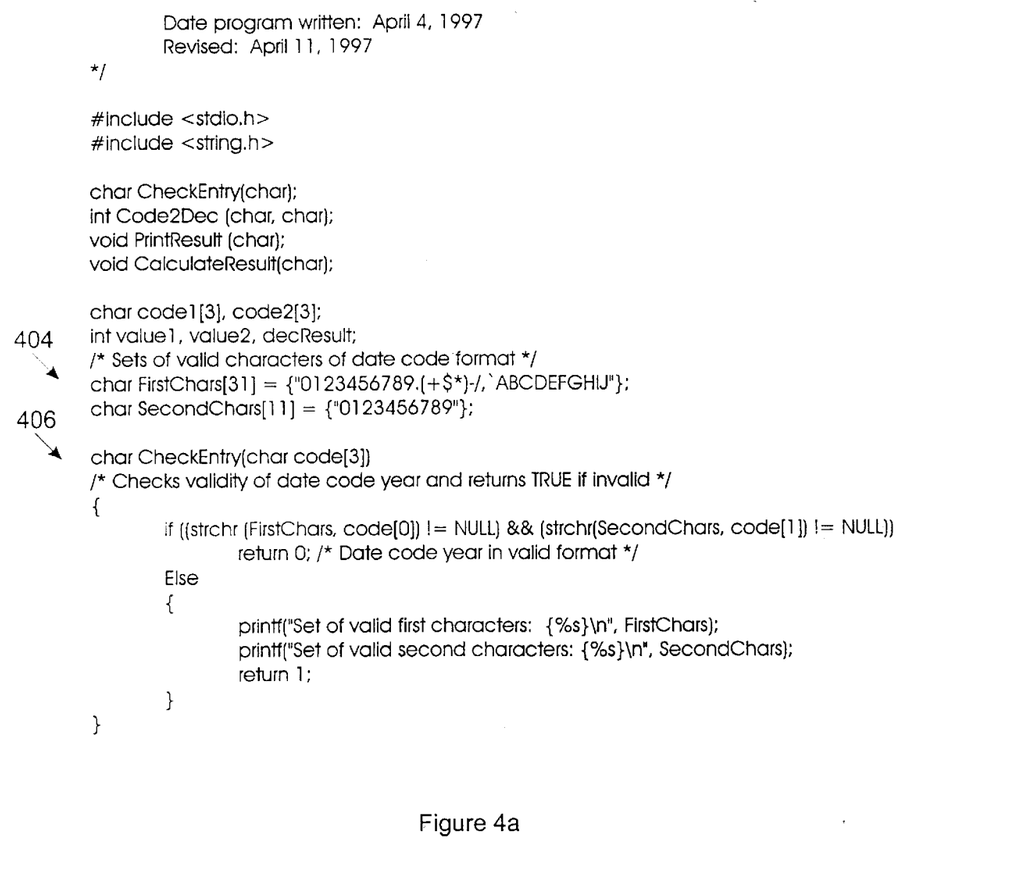
Figure 4C:
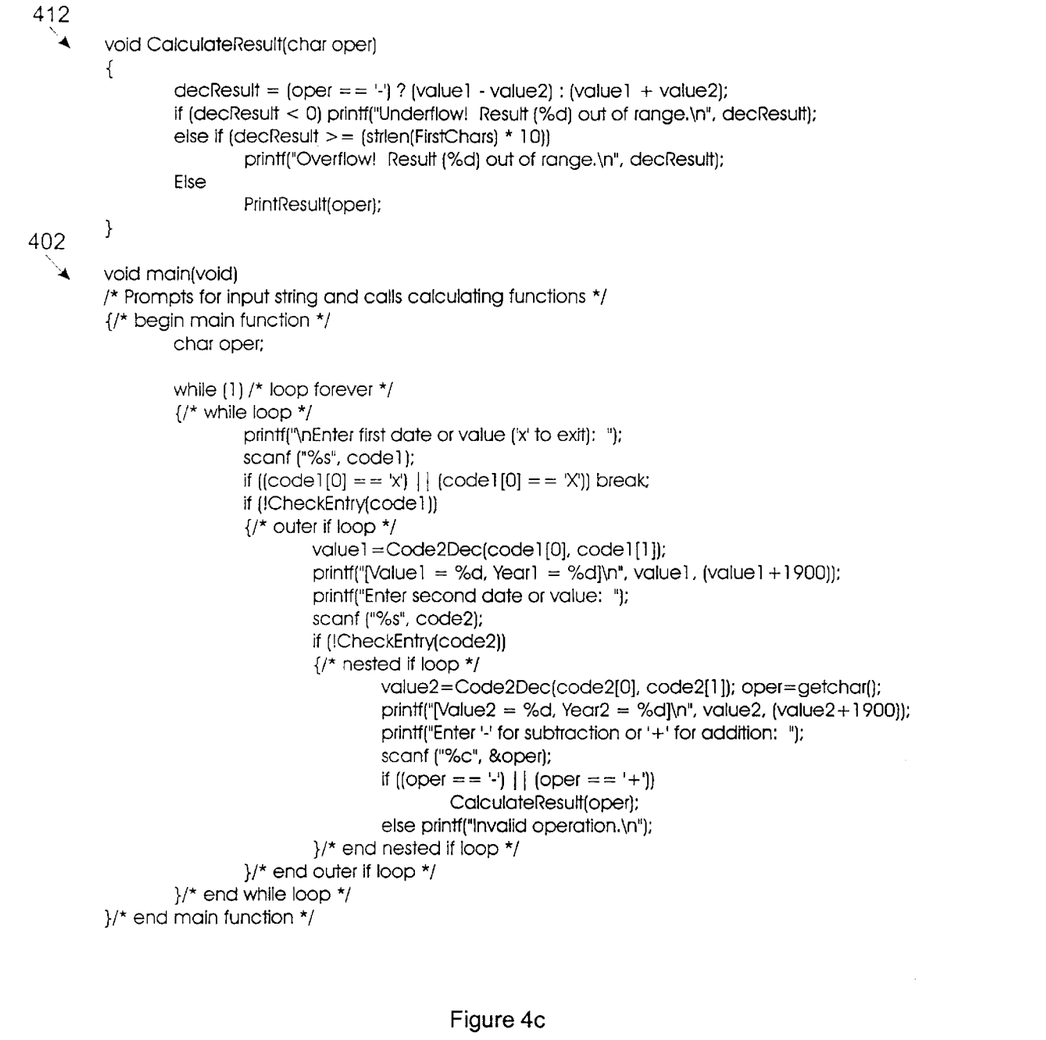

FIG. 4 illustrates an example of a program that is able to understand and manipulate year codes that use the extended symbols shown in Table 1 according to the interpretation shown in Table 2. The program shown in FIG. 4 is written in the 'C' programming language, and demonstrates that year codes using extended symbols can be implemented.

The 'C' program starts with a 'main' procedure generally labeled 402. The main procedure 402 prompts a user to enter a string containing two year codes, possibly containing extended symbols, and an operation symbol '+' (addition) or '−' (subtraction). The main procedure then calls functions that perform the operation requested upon the year codes entered. The program illustrated in FIG. 4 defines the set of extended symbols shown in Table 1 with code generally indicated as section 404. The code at section 404 stores the extended symbols in an array for future reference. Arbitrary extended symbols, for example, those shown in FIG. 2, may be stored in an array as well by directly coding their predetermined bit patterns into an array. The bit patterns may be chosen to replace pre-existing character definitions, or may fill in open spaces in a character set.

A COBOL compiler or other computer language compiler implementing extended symbols may use a similar data structure to hold the table of extended symbols that a year code will use. The COBOL compiler or other computer language compiler may then add this structure to programs it compiles so that they may use the extended symbols.

The program in FIG. 4 also uses validity code 404 to detect whether a user has entered a symbol for a year code that is not valid. Essentially, the validity code 406 checks to see whether the symbols entered by the user exist in the array indicated at 404. Printing code 408 is included to display the results of year code manipulations by the program. An example of the program output may be seen in FIG. 5.

As mentioned above, the program may add and subtract year codes using extended symbols. One step in this process is to convert the year code to an intermediate value, accomplished by the code generally indicated at 410. The conversion code 410 looks up the year codes entered by the user, finds the expansion for any extended symbols, as indicated in Table 2, and uses the expansion to generate an intermediate conventional result. For example, '+0' is converted to the conventional value 120 that is then used to add the dates or subtract the dates.

Calculation code 412 converts the two year codes entered by the user into intermediate conventional results using conversion code 410, then performs subtraction or addition (depending on the operation symbol ('+' or '−') initially entered by the user) using standard subtraction or addition arithmetic to produce an intermediate subtraction or addition result. The calculation code 412 determines whether to add or subtract the intermediate conventional results according to the operation symbol entered by the user while the program is executing the 'main' code 402.

Figure 5:
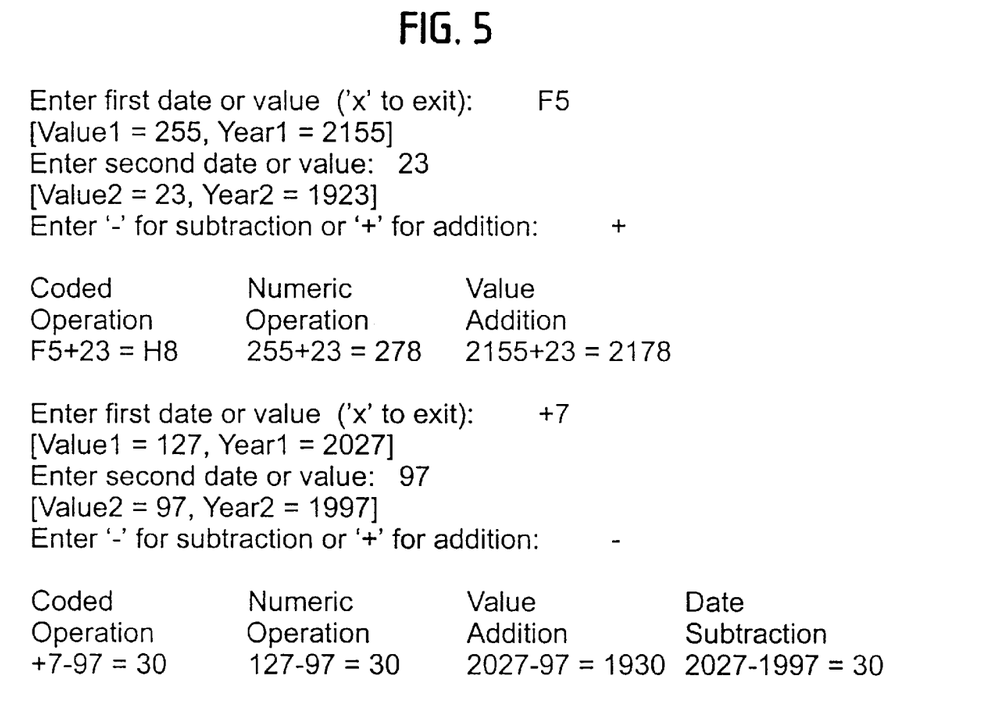
FIG. 5 shows an example of the output produced by the program shown in FIG. 4.

The calculation code 412 passes its intermediate subtraction or addition result to the printing code 408. The printing code 408 converts the intermediate result to its extended symbol year code, using an offset of 1900 years (thus '+0' represents 120 in conventional notation, but the year 1900+ 120=2020 in extended symbol notation). The printing code 408 displays the coded operation, the numeric operation using conventional notation, and the results of adding and subtracting the year codes entered by the user. FIG. 5 illustrates two examples.

The assembly language code equivalent for the 'C' program shown in FIG. 4 is included at the end of this specification. A 'C' compiler directly converted the 'C' source code to its assembly language code equivalent. Included with the assembly language code is each individual 'C' source code instruction and its corresponding assembly language source code equivalent directly below. Thus, the date code solution can be compiled to run on any processor.

The assembly language code presented runs on an Intel™ 386 or higher processor and illustrates the sequence of instructions that a COBOL compiler might generate in order to support extended symbols for year codes for COBOL programs running on an Intel™ processor. It will be noted that the invention is not restricted to running on any particular processor, however. Rather, the invention may be implemented on any processor (or in a COBOL compiler or in any other programming language compiler supporting multiple processors), including those used in microcomputers, mini computers, and mainframe computers manufactured by companies including IBM, HP, and DEC.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features that come within the spirit and scope of the invention.

What is claimed is:

1. A method for extending the capacity of a date code, said method comprising:
   selecting at least one additional character symbol exclusive of the symbols 0, 1, 2, 3, 4, 5, 6, 7, 8, and 9 provided in a predetermined character set to allow in an individual digit in an extended date code;
   assigning an expansion to each of said additional character symbols, said expansion providing a value for each of said additional character symbols;
   constructing said extended date code using at least one of said additional character symbols; and
   interpreting said expanded date code in accordance with said expansion during arithmetic operations including addition and subtraction.

2. The method of claim 1, wherein said additional character symbols are selected from symbols already defined in said predetermined character set.

3. The method of claim 2, wherein said predetermined character set is an EBCDIC character set.

4. The method of claim 1, further comprising the step of interpreting said extended date code in accordance with said expansion and displaying a four digit year represented by said extended date code using only the symbols 0, 1, 2, 3, 4, 5, 6, 7, 8, and 9.

5. The method of claim 1, further comprising the step of interpreting said extended date code in accordance with said expansion and displaying a four digit year represented by said extended date code using only the symbols 0, 1, 2, 3, 4, 5, 6, 7, 8, and 9.

6. The method of claim 1, wherein said predetermined character set is an EBCDIC character set.

7. The method of claim 6, wherein said selecting step further comprises selecting a plurality of additional character symbols sharing a common set of bits.

8. The method of claim 6, wherein said selecting step further comprises selecting a plurality of additional character symbols sharing a common set of upper four bits in an EBCDIC code.

9. The method of claim 1, further comprising the step of displaying said extended date code using at least one additional character symbol.

10. The method of claim 1, wherein said step of assigning an expansion comprises assigning at least one expansion of at least two digits.

11. The method of claim 1, wherein said step of assigning an expansion comprises assigning at least one expansion of at least three digits.

12. A method for extending the capacity of a date code, said method comprising:
   creating at least one additional display symbol exclusive of the symbols in a predetermined character set and further exclusive of the symbols 0, 1, 2, 3, 4, 5, 6, 7, 8, and 9, said additional display symbols created for placement in individual digits in an extended date code;
   assigning each of said additional display symbols a location in said predetermined character set;
   assigning an expansion to each of said additional display symbols, said expansion providing a value for each of said additional display symbols;
   constructing said extended date code using at least one symbol in said set of additional display symbols;
   interpreting said expanded date code in accordance with said expansion during arithmetic operations including addition and subtraction.

13. The method of claim 4, wherein said step of assigning said additional display symbols a location assigns said display symbols unused binary patterns in said predetermined character set.

14. The method of claim 12, wherein said step of assigning said additional display symbols a location replaces an assignment to a previously defined character in said predetermined character set.

15. The method of claim 12, wherein said step of assigning a location further comprises assigning a plurality of display symbols to locations sharing a common set of bits.

16. The method of claim 15, wherein said step of assigning a location further comprises assigning a plurality of display symbols to locations sharing a common set of upper four bits in an EBCDIC code.

17. The method of claim 12 wherein said step of assigning an expansion comprises assigning at least one expansion of at least two digits.

18. The method of claim 12 wherein said step of assigning an expansion comprises assigning at least one expansion of at least three digits.

\* \* \* \* \*

UNITED STATES PATENT AND TRADEMARK OFFICE
CERTIFICATE OF CORRECTION

PATENT NO. : 5,950,197
DATED : September 7, 1999
INVENTOR(S) : William N. Beam

It is certified that error appears in the above-identified patent and that said Letters Patent is hereby corrected as shown below:

In column 3, line 25, --or 0 1 0 1 1 0-- should read --or 0 1 0 1 1 00--.

In column 3, line 28, --equivalent 1 1 01 0 100-- should read --equivalent 0 1 0 1 0 100--.

In column 8, line 49, --△ through △-- should read --△0 through △9--.

In column 8, table 5, in the last EBCDIC Binary entry, --1111 1011 1111 1001-- should read --1111 1001 1111 1001--.

In column 9, table 5, row 12, --2100-- should read --2110--.

In the Claims:

In claim 13, --The method of claim 4-- should read --The method of claim 12--.

Signed and Sealed this

Twenty-first Day of March, 2000

Attest:

*Attesting Officer*

Q. TODD DICKINSON

*Commissioner of Patents and Trademarks*